United States Patent [19]
Yoshikawa

[11] Patent Number: 4,876,696
[45] Date of Patent: Oct. 24, 1989

[54] TRANSMISSION SYSTEM FOR TRANSMITTING MULTIFREQUENCY SIGNALS OR MODEM SIGNALS WITH SPEECH SIGNALS

[75] Inventor: Toshio Yoshikawa, Tokyo, Japan

[73] Assignee: NEC Corporation, Tokyo, Japan

[21] Appl. No.: 75,455

[22] Filed: Jul. 20, 1987

[30] Foreign Application Priority Data

Jul. 18, 1986 [JP] Japan .............................. 61-167793
Sep. 30, 1986 [JP] Japan .............................. 61-230132

[51] Int. Cl.$^4$ .............................................. H04J 3/16
[52] U.S. Cl. ......................................... 375/5; 370/111
[58] Field of Search .......................... 375/25, 8, 28, 5; 370/110.1, 111,110.4, 76, 69.1; 379/90, 93, 97, 98

[56] References Cited

U.S. PATENT DOCUMENTS

| | | | |
|---|---|---|---|
| 3,304,372 | 2/1967 | Filipowsky et al. | 370/111 |
| 3,735,048 | 5/1973 | Tomsa et al. | 370/111 |
| 4,377,860 | 3/1983 | Godbole | 375/5 |
| 4,449,218 | 5/1984 | Strehl | 370/76 |

OTHER PUBLICATIONS

Analog/Digital, Bipolar/CMOS Integrated Circuits Data Book, published 1968 by Silicon System, California, pp. 1-26 and 1-31.
Telecommunications Device Data, published 1985 by Motorola Inc., pp. 2-70 to 2-84 and 2-62 to 2-69.

*Primary Examiner*—Robert L. Griffin
*Assistant Examiner*—Marianne Huseman
*Attorney, Agent, or Firm*—Sughrue, Mion, Zinn, Macpeak & Seas

[57] ABSTRACT

A transmission system for transmitting modem signals or multifrequency (MF) signals together with speech signals over the same digital transmission line. The system includes a transmitter which has a first coder that efficiently encodes a speech signal to produce a first coded output, a detector for detecting a multifrequency signal or modem signal, a second encoder which produces a second coded output from the multifrequency signal or modem signal, and a selector for selecting either the first or second coded output in response to the output of the detector. The transmission system also includes a receiver which has a separator for separating a signal transmitted from the transmitting means into the first and second coded outputs, a first decoder for decoding the first coded output and a second decoder for decoding the second coded output.

1 Claim, 1 Drawing Sheet

TRANSMISSION SYSTEM FOR TRANSMITTING MULTIFREQUENCY SIGNALS OR MODEM SIGNALS WITH SPEECH SIGNALS

BACKGROUND OF THE INVENTION

The present invention relates to a transmission system capable of transmitting modem signals or multifrequency (MF) signals together with speech signals over the same digital transmission line.

A coding system using adaptive differential pulse modulation (ADPCM) and a multi-pulse coding system are highly efficient implementations for coding speech signals, and are well known in the art. A problem encountered in the prior art is that when modem signals, or MF signals which are different from speech signals, are transmitted over the same digital transmission line as speech signals by such a high efficient coding system, the coded MF signals or modem signals cannot be decoded without errors. In the light of this, it has been customary to provide a digital transmission line which is adapted for a highly efficient coding system independently of a separate digital transmission line adapted for the transmission of modem signals or MF signals, at the sacrifice of cost.

SUMMARY OF THE INVENTION

It is therefore an object of the present invention to provide a cost-effective transmission system which allows modem signals or MF signals to be transmitted together with speech signals over the same digital transmission line.

A transmission system of the present invention comprises a transmitting means comprising a first coding means for highly efficiently coding a speech signal to produce a first coded output, detecting means for detecting a multi-frequency signal or a modem signal, second coding means for coding the multifrequency signal or the modem signal to produce a second coded output, and means for selecting one of the first and second coded outputs in response to an output of the detecting means. The transmission system further comprises receiving means comprising separating means for separating a signal transmitted from the transmitting means into the first and second coded outputs, first decoding means for decoding the first coded output after separation, and second decoding means for decoding the second coded output separation.

BRIEF DESCRIPTION OF THE DRAWINGS

The above and other objects, features and advantages of the present invention will become apparent from the following details description when taken with the accompanying drawings in which.

DESCRIPTION OF THE PREFERRED EMBODIMENT

Figure 1:
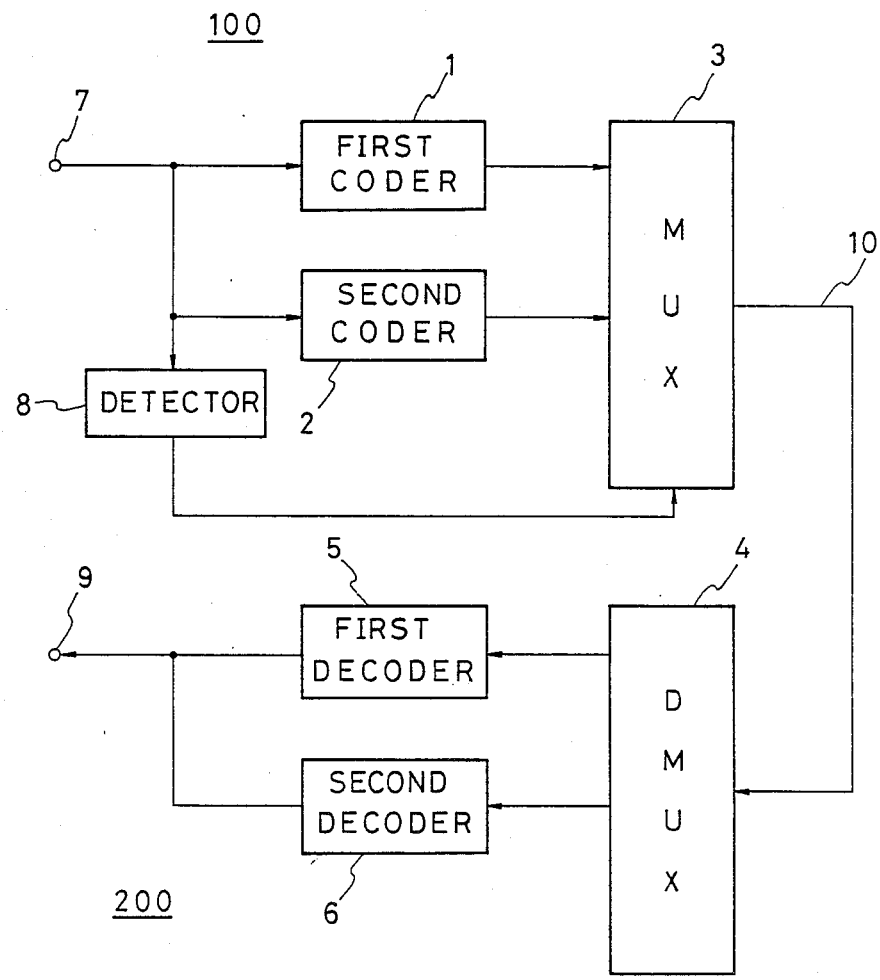
FIG. 1 is a block diagram showing a transmission system embodying the present invention.
Figure 2:
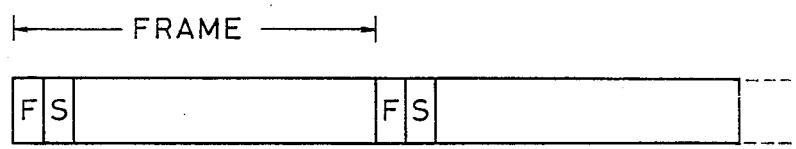
FIG. 2 shows a frame format which is applicable to the transmission system of the present invention.

Referring to FIG. 1 of the drawings, a preferred embodiment of the present invention is shown in a block diagram. As shown, a transmitter 100 includes a first coder 1 and a second coder 2 which are adapted to encode an analog signal coming in through a terminal 7. The outputs of the first and second coders 1 and 2 will hereinafter be referred to as a first and a second coded output, respectively. In this particular embodiment, the first coder 1 is implemented with a multi-pulse coder for speech signals as disclosed in U.S. Pat. No. 4,472,832 (reference 1), and the second coder 2 is implemented with a receiver section of a multifrequency (MF) transceiver SSI20C89 as disclosed in Analog/Digital, Bipolar/CMOS Integrated Circuits Data Book, page 1-26 to page 1-31, published in 1986 by Silicon System, California (reference 2). A detector 8 functions to determine if the input analog signal is a speech signal or an MF signal. When the coder 2 is implemented with the above-mentioned MF transceiver of the Data Book, the detector 8 is implemented with a bandpass filter and an amplitude detector which are built in the transceiver. A multiplexer (MUX) 3 selects either the first coder 1 or the second coder 2 in response to an output of the detector 8, delivering an output of the coder 1 or 2 to a digital transmission line 10 in a frame format of FIG. 2. The MUX 3 serves the function of generating a frame bit F for constituting a frame, and the function of generating a data indication bit S indicative of which one of speech data (first encoded output) and MF coded data (second coded output) is contained in the frame.

The data transmitted from the transmitter 100 over the digital transmission line 10 is fed to a receiver 200. In the receiver 200, a demultiplexer (DEMUX) 4 delivers the first coded output to a first decoder 5 and the second coded output to the second decoder 6, in response to the data indication bit S which are contained in the received signal. Decoders 5 and 6 decode, respectively, the first and second coded outputs to produce the original signal which is then applied to a terminal 9. When the multi-pulse coder and the MF transceiver are used for, respectively, the first and second coders, the first and second decoders 5 and 6 are implemented with a decoder and a transmitter section as disclosed in the previously stated references 1 and 2.

While the second coder 2 and the second decoder 6 have been described as comprising, respectively, an MF receiver and an MF transmitter, they may be replaced with demodulator MC6173 as described in Telecommunications Device Data (reference 3), pp. 2-70 to 2-84, published in 1985 by Motorola INC. and modulator MC6172 as described in the same Device Data, pp. 2-62 to 2-69. In such an alternative case, the detector 8 is constituted by a carrier detector which is built in the demodulator.

In summary, it will be seen that the present invention provides a cost-effective transmission system in which modem signals or MF signals may be transmitted together with speech signals over the same digital transmission line by providing a signal detector responsive to modem signals or to MF signals and a multiplexer.

I claim:

1. A transmission system comprising:
  transmitting means comprising a common input terminal for receiving a speech signal and one of a dual tone signal and a modulated signal, first coding means connected to said common input terminal for efficiently coding said speech signal to produce a first coded output, detecting means connected to said common input terminal for detecting said one of said dual tone signal and said modulated signal, second coding means connected to said common input terminal for coding said one of said dual tone and said modulated signal to produce a second coded output, and means for selecting one of said first and second coded outputs in response to an output of said detecting means; and receiving means comprising separating means for separating a signal transmitted from said transmitting means into said first and second coded outputs, first decoding means for decoding said first coded output from said separating means, and second decoding means for decoding said second coded output from said separating means.

* * * * *